(12) United States Patent
Chun

(10) Patent No.: US 9,316,861 B2
(45) Date of Patent: Apr. 19, 2016

(54) DISPLAY MODULE AND LCD HAVING THE SAME

(75) Inventor: Jin Young Chun, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 987 days.

(21) Appl. No.: 12/601,707

(22) PCT Filed: Jun. 5, 2008

(86) PCT No.: PCT/KR2008/003173
§ 371 (c)(1),
(2), (4) Date: Nov. 24, 2009

(87) PCT Pub. No.: WO2008/150125
PCT Pub. Date: Dec. 11, 2008

(65) Prior Publication Data
US 2010/0171729 A1    Jul. 8, 2010

(30) Foreign Application Priority Data
Jun. 5, 2007    (KR) .................. 10-2007-0054959

(51) Int. Cl.
*G06F 3/038* (2013.01)
*G02F 1/1335* (2006.01)
*G02F 1/1333* (2006.01)
*G02F 1/133* (2006.01)

(52) U.S. Cl.
CPC ...... *G02F 1/133555* (2013.01); *G02F 1/13338* (2013.01); *G02F 1/13318* (2013.01); *G02F 1/133514* (2013.01); *G02F 2201/52* (2013.01)

(58) Field of Classification Search
CPC .......... G06F 3/038; G06F 3/0412; G09G 3/36
USPC ............................ 345/211, 88, 173, 175, 207
See application file for complete search history.

(56) References Cited

U.S. PATENT DOCUMENTS

| 6,195,140 | B1* | 2/2001 | Kubo et al. ..................... 349/44 |
| 2003/0156230 | A1 | 8/2003 | Boer et al. |
| 2005/0052435 | A1* | 3/2005 | Cho et al. ..................... 345/182 |
| 2006/0044239 | A1 | 3/2006 | Kamijo et al. |
| 2006/0077149 | A1 | 4/2006 | Gally et al. |
| 2006/0139527 | A1* | 6/2006 | Chang et al. ................. 349/114 |
| 2006/0146038 | A1* | 7/2006 | Park et al. ..................... 345/173 |

(Continued)

FOREIGN PATENT DOCUMENTS

| KR | 10-2003-0032339 A | 4/2003 |
| KR | 10-2006-0133194 A | 12/2006 |

(Continued)

*Primary Examiner* — Jose Soto Lopez
(74) *Attorney, Agent, or Firm* — Birch, Stewart, Kolasch & Birch, LLP

(57) ABSTRACT

An embodiment provides a display module comprising: a first substrate comprising a red filter, a green filter, a blue filter, and a white filter; a second substrate disposed facing the first substrate and comprising a first switching device and a first transparent electrode being formed corresponding to a position where the red filter is disposed, a second switching device and a second transparent electrode being formed corresponding to a position where the green filter is disposed, a third switching device and a third transparent electrode being formed corresponding to a position where the blue filter is disposed, and a fourth switching device and a reflective part being formed corresponding to a position where the white filter is disposed; and a liquid crystal layer formed between the first substrate and the second substrate.

15 Claims, 2 Drawing Sheets

(56) References Cited

U.S. PATENT DOCUMENTS

2006/0262262 A1* 11/2006 Kim et al. .................... 349/139
2006/0284805 A1    12/2006 Baek
2007/0171218 A1     7/2007 Hong et al.
2007/0176905 A1     8/2007 Shih et al.

FOREIGN PATENT DOCUMENTS

| KR | 10-2007-0077889 A | 7/2007 |
| WO | WO 2005/101807 A2 | 10/2005 |
| WO | WO-2006/036559 A1 | 4/2006 |

* cited by examiner

DISPLAY MODULE AND LCD HAVING THE SAME

CROSS-REFERENCE TO RELATED APPLICATIONS

This application is the U.S. national stage application of International Patent Application No. PCT/KR2008/003173, filed Jun. 5, 2008, which claims priority to Korean Application No. 10-2007-0054959, filed Jun. 5, 2007, the disclosures of each of which are incorporated herein by reference in their entirety.

TECHNICAL FIELD

Embodiments relate to a display module and a liquid crystal display (LCD) device comprising the same.

BACKGROUND ART

Various display devices have been suggested to display an image. These display devices adopt a luminance sensor in order to control light emitting brightness by measuring surrounding luminance. Additionally, provided is a display device in which an additional touch screen panel capable of detecting a contact position of a user to perform a touch panel function is mounted on a display panel. However, because an additional touch screen panel is required to be mounted in order to realize a touch panel, there is a disadvantage which increases the thickness of a display device.

DISCLOSURE OF INVENTION

Technical Problem

Embodiments provide a display module that effectively detecting surrounding luminance and a contact position of an object, and an LCD device comprising the same.

Technical Solution

An embodiment provides a display module comprising: a first substrate comprising a red filter, a green filter, a blue filter, and a white filter; a second substrate disposed facing the first substrate and comprising a first switching device and a first transparent electrode being formed corresponding to a position where the red filter is disposed, a second switching device and a second transparent electrode being formed corresponding to a position where the green filter is disposed, a third switching device and a third transparent electrode being formed corresponding to a position where the blue filter is disposed, and a fourth switching device and a reflective part being formed corresponding to a position where the white filter is disposed; and a liquid crystal layer formed between the first substrate and the second substrate.

An embodiment provides a display module comprising: a pixel area comprising a gate line, a data line intersecting the gate line, a switching device formed on an intersection area of the gate line and the data line, and a transparent electrode connected to the switching device; and a contact position detection area comprising the gate line, a sensing line intersecting the gate line, and a detection device disposed on an intersection area of the gate line and the sensing line, and being changed in an amount of a current flowing according to incident light.

An embodiment provides a liquid crystal display device comprising: a display module; and a backlight assembly providing light to the display module; wherein the display module comprises: a first substrate comprising a red filter, a green filter, a blue filter, and a white filter; a second substrate disposed facing the first substrate and comprising a first switching device and a first transparent electrode being formed corresponding to a position where the red filter is disposed, a second switching device and a second transparent electrode being formed corresponding to a position where the green filter is disposed, a third switching device and a third transparent electrode being formed corresponding to a position where the blue filter is disposed, and a fourth switching device and a reflective part being formed corresponding to a position where the white filter is disposed; and a liquid crystal layer formed between the first substrate and the second substrate, wherein the liquid crystal display device comprises a first drive mode and a second drive mode, wherein the first drive mode displays a color image in a first direction of the display module by adjusting an amount of light transmitted through the red filter, the green filter and the blue filter through light provided form the backlight assembly, and the second drive mode displays a black and white image in the first direction of the display module by using incident light from surrounding and adjusting an amount of light reflected from the reflective part and transmitted through the white filter.

Advantageous Effects

A display module according to an embodiment and an LCD device comprising the same effectively detect surrounding luminance and a contact position of an object.

MODE FOR THE INVENTION

In the description of the embodiments, it will be understood that when a layer (or film), a region, a pattern, or a structure is referred to as being "on" or "under" another substrate, another layer (or film), another region, another pad, or another pattern, it can be "directly" or "indirectly" on/under the other substrate, layer (or film), region, pad, or pattern.

Hereinafter, embodiments will be described with the accompanying drawings.

Figure 1:
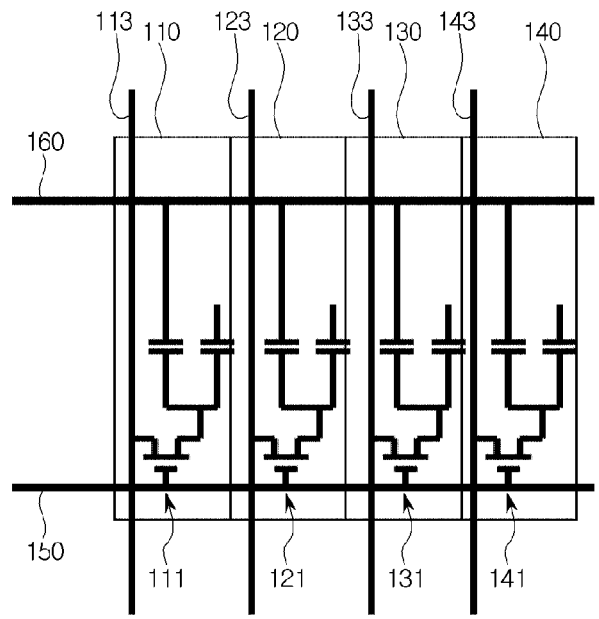
FIGS. 1 and 2 are conceptual views of a display module according to an embodiment.
Figure 2:
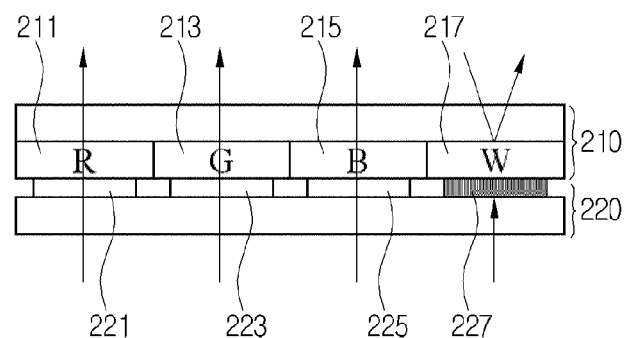

FIGS. 1 and 2 are conceptual views of a display module according to an embodiment. FIG. 1 shows equivalent circuit of a display module according to the embodiment and FIG. 2 is a cross-sectional view of the display module according to the embodiment.

The display module according to the embodiment comprises a first substrate 210 and a second substrate 220. The first substrate 210 comprises a red filter 211, a green filter 213, a blue filter 215, and a white filter 217. The second substrate 220 comprises a first transparent electrode 221, a second transparent electrode 223, a third transparent electrode 225, and a reflective part 227. A liquid crystal layer may be formed between the first substrate 210 and the second substrate 220.

The display module according to the embodiment comprises a first sub-pixel area 110, a second sub-pixel area 120, a third sub-pixel area 130, and a fourth sub-pixel area 140. A first switching device 111 and a first sub-pixel data line 113 are formed in the first sub-pixel area 110. A second switching device 121 and a second sub-pixel data line 123 are formed in the second sub-pixel area 120. A third switching device 131 and a third sub-pixel data line 133 are formed in the third sub-pixel area 130. A fourth switching device 141 and a fourth sub-pixel data line 143 are formed in the fourth sub-pixel area 140. A reference number 150 represents a gate line, and a reference number 160 represents a common line forming a storage capacitor.

The first substrate 210 is disposed to face the second substrate 220. The first switching device 111 is formed on an intersection area of the gate line 150 and the first sub-pixel data line 113. The first switching device 111 is connected to the first transparent electrode 221 and controls an amount of light transmitted through the first sub-pixel area 110. The second switching device 121 is formed on an intersection area of the gate line 150 and the second sub-pixel data line 123. The second switching device 121 is connected to the second transparent electrode 223 and controls an amount of light transmitted through the second sub-pixel area 120. The third switching device 131 is formed on an intersection area of the gate line 150 and the third sub-pixel data line 133. The third switching device 131 is connected to the third transparent electrode 225 and controls an amount of light transmitted through the third sub-pixel area 130.

The first switching device 111, the second switching device 121, the third switching device 131, and the fourth switching device 141 may be formed of a thin film transistor comprising an amorphous silicon layer. Additionally, the first switching device 111, the second switching device 121, and the third switching device 131 may be formed of a thin film transistor comprising a polycrystalline silicon layer.

For example, the red filter 211 may be disposed on the first sub-pixel area 110, and the green filter 213 may be disposed on the second sub-pixel area 120. Additionally, the blue filter 215 may be disposed on the third sub-pixel area 130, and the white filter 217 may be disposed on the fourth sub-pixel area 140. In the display module according to the embodiment, one pixel displaying an image may comprise at least each one of the first sub-pixel area 110, the second sub-pixel area 120, the third sub-pixel area 130, and the fourth sub-pixel area 140.

The size of the fourth sub-pixel area 140 may be formed smaller than the sizes of the first sub-pixel area 110, the second sub-pixel area 120, and the third sub-pixel area 130. The size of the white filter 217 may be formed smaller than the sizes of the red filter 211, the green filter 213, and the blue filter 215.

In the display module according to the embodiment, light incident from the bottom is not transmitted through an area where the reflective part 227 is formed, but is transmitted through areas where the first transparent electrode 221, the second transparent electrode 223, and the third transparent electrode 225 are formed in order to realize a color image. On the other hand, light incident from the top is reflected from the reflective part 227 and progresses into a top direction such that brightness of a displayed image can be improved.

The reflective part 227 may comprise a first reflective part formed of the same material on the same layer as a gate electrode constituting the fourth switching device 141. Additionally, the reflective part 227 may comprise a second reflective part formed of the same material on the same layer as a drain electrode constituting the fourth switching device 141. The reflective part 227 may be formed with the size corresponding to an area of the white filter 217. Accordingly, light incident from the bottom of the display module can be prevented from being transmitted through the white filter 217, thereby stopping light leakage from affecting an image display.

The display module comprising the above structure utilizes the fourth sub-pixel area 140 and the fourth switching device 141, thereby effectively realizing functions such as a luminance sensor and a touch panel.

First, a luminance sensor function in the display module according to the embodiment will be described with reference to FIGS. 1 to 3.

The display module according to the embodiment measures surrounding luminance by sensing changes in an amount of a current flowing through the fourth switching device 141. The fourth switching device 141 may be formed of a thin film transistor comprising amorphous silicon.

A photo leakage current flows through the fourth switching device 141 due to incident light. The fourth switching device 141 comprises amorphous silicon such that a photo leakage current occurs due to light incident to the amorphous silicon. The white filter 217 is disposed on the fourth sub-pixel area 140 where the fourth switching device 141 is placed. Accordingly, compared to when a color filter is disposed, an amount of light transmitted through the white filter 217 is increased such that an amount of light incident to the fourth switching device 141 is increased also. Therefore, the display module according to the embodiment effectively performs a luminance sensor function.

Figure 3:
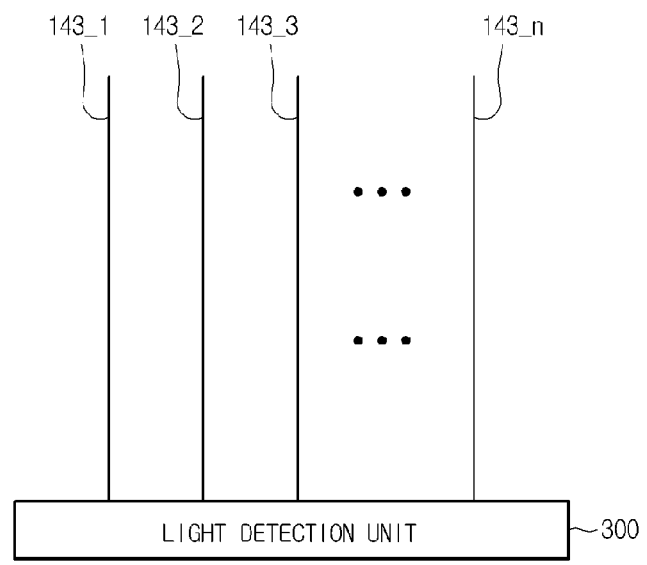
FIG. 3 is a view illustrating a luminance measuring function in a display module according to an embodiment.

The display module according to the embodiment, as illustrated in FIG. 3, comprises a plurality of fourth sub-pixel data lines 143_1 to 143_$n$ and a photo sensing unit 300. Each of the fourth sub-pixel data lines 143_1 to 143_$n$ is formed on each pixel area. A photo leakage current flowing through the fourth sub-pixel data lines 143_1 to 143_$n$ is transferred into the photo sensing unit 300. The photo sensing unit 300 senses an amount of current provided from fourth sub-pixel data lines 143_1 to 143_$n$ such that surrounding luminance can be measured. The display module according to the embodiment can control light emitting luminance by reflecting surrounding luminance measured in the photo sensing unit 300. For example, the display module can adjust light emitting brightness according to surrounding luminance by controlling the degree of light emitting of a backlight assembly.

Moreover, the display module according to the embodiment can perform a touch panel function effectively. The touch panel function will be described with reference to FIGS. 1, 2 and 4. The display module according to the embodiment does not need to comprise an additional touch screen panel in order to realize the touch panel function. Accordingly, a display module comprising a touch panel function may be realized with a thin thickness.

Figure 4:
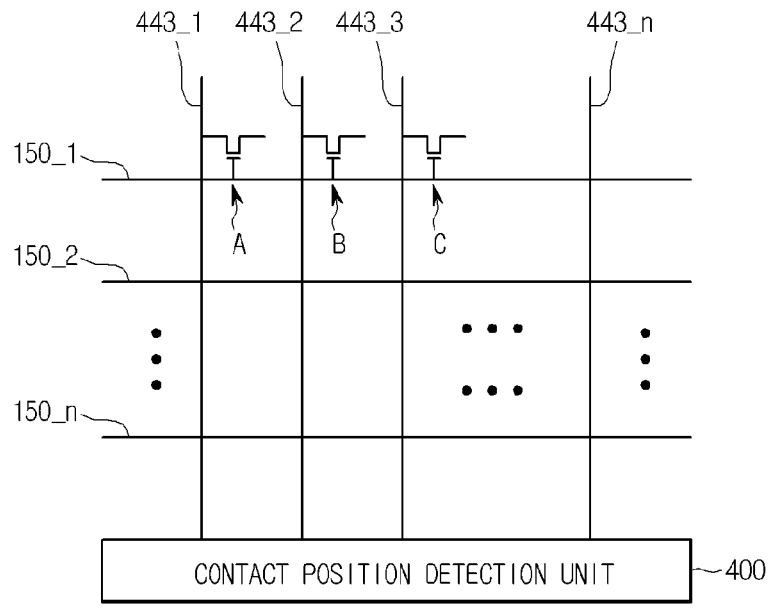
FIG. 4 is a view illustrating a touch panel function in a display module according to an embodiment.

The display module according to the embodiment, as illustrated in FIG. 4, comprises a plurality of sensing lines 443_1 to 443_$n$, a plurality of gate lines 150_1 to 150_$n$, and a contact position detection unit 400.

The sensing lines 443_1 to 443_$n$ are disposed intersecting the gate lines 150_1 to 150_$n$. The fourth sub-pixel data line 143 described referring to FIGS. 1 and 2 may be utilizes as the sensing lines 443_1 to 443_$n$. If the fourth sub-pixel data line 143 is utilized as the sensing line, the fourth sub-pixel area 140 may be defined as a connection position detection area, and the fourth switching device 141 may be defined as a detection device.

The detection device may be formed of a thin film transistor comprising amorphous silicon. A current flowing through the detection device is a photo leakage current caused by light incident to the contact position detection area. Accordingly, a position of an object contacting the display module can be detected by measuring changes of the photo leakage current flowing through the detection device. The white filter may be disposed on the contact position detection area where the detection device is formed.

A photo leakage current flowing through the detection device is transferred into the sensing lines 443_1 to 443_n. Additionally, the contact position detection unit 400 detects an amount of current flowing through the sensing lines 443_1 to 443_n.

On the other hand, an amount of a photo leakage current flowing through the detection device connected to the gate lines 150_1 to 150_n is changed according to whether or not there is a voltage applied to the gate lines 150_1 to 150_n. Accordingly, an amount of a current flowing through the sensing lines 443_1 to 443_n is changed according to whether or not there is a voltage applied to the gate lines 150_1 to 150_n.

A voltage is sequentially applied to the gate lines 150_1 to 150_n by scan drive. For example, if a voltage is applied to the gate line 150_1, it is applied to each gate electrode of the detection devices A, B, and C connected to the gate line 150_1. Likewise, a more amount of a photo leakage current flows through the detection devices A, B, and C where a voltage is applied to each gate electrode thereof, compared to when a voltage is not applied.

On the other hand, let's assume one case that external light is not projected on an area where the detection device A is formed. This may occur when an object contacts the display module surface of an area where the detection device A is formed. Likewise, if external light is not projected on the area where the detection device A is formed, a photo leakage current does not flow through the detection device A. Accordingly, even when a voltage is applied to the gate line 150_1 providing a gate voltage to the detection device A, a current does not flow through the detection device A.

However, a photo leakage current flows through the detection devices B and C to which external light is projected, and when a voltage is applied to the gate line 150_1, a sudden current increase occurs in the detection devices B and C.

Likewise, when a voltage is applied to the gate line 150_1, it can be determined whether or not external light is projected on an area where a corresponding detection device is formed by detecting changes in an amount of a photo leakage current flowing through the detection devices connected to the gate line 150_1.

By using this phenomenon, the display module according to the embodiment can perform a touch panel function. That is, it can be determined whether or not there is an object contact and that its contact position by measuring changes in an amount of a photo leakage current flowing through the detection devices through scan drive for the gate line.

For example, the display module comprises the first substrate 210 and the second substrate 220 as illustrated with reference to FIGS. 1 and 2. An image can be displayed in a top direction of the first substrate 210, and a menu item can be displayed for user selection. At this point, a touch panel function can be performed by determining whether or not there is an object placed on the surface of the first substrate 210. If there is an object placed on the surface of the first substrate 210, a menu item displayed on a corresponding position can be executed.

Figure 5:
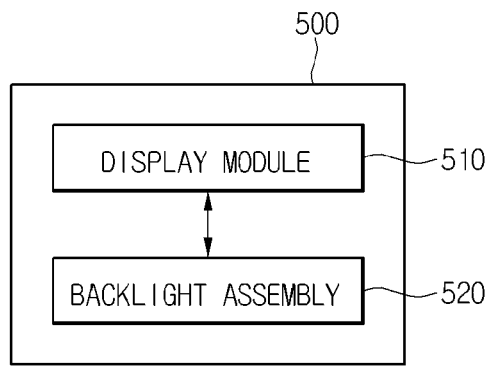
FIG. 5 is a view of a liquid crystal display device according to an embodiment.

Then, the display module according to the above-mentioned embodiment may be applied to a liquid crystal display (LCD) device. As illustrated in FIG. 5, an LCD device 500 according to the embodiment may comprise a display module 510 and a backlight assembly 520 providing light to the display module 510.

As described above, the LCD 500 device can effectively perform a luminance sensor function and a touch panel function.

Additionally, the LCD device 500 comprises a first drive mode displaying an image in a first direction of the display module 510 by using light provided form the backlight assembly 520, and a second drive mode displaying an image in the first direction of the display module 510 by using light incident from the surrounding.

A case where the LCD device 500 is driven in the first drive mode will be described with reference to FIGS. 1, 2, and 5.

If being driven in the first drive mode, the LCD device 500 displays an image in a top direction of the first substrate 210 by using light provided from the backlight assembly 520. The LCD device 500 can display a color image in the top direction of the first substrate 210 by adjusting an amount of light transmitted through the red filter 211, the green filter 213, and the blue filter 215.

A case where the LCD device 500 is driven in the second drive mode will be described with reference to FIGS. 1, 2, and 5.

If being driven in the second drive mode, the LCD device 500 displays an image in the top direction of the first substrate 210 by using light incident from the surrounding. The LCD device 500 can display a black and white image in the top direction of the first substrate 210 by adjusting an amount of light transmitted through the white filter 217. At this point, the light transmitted through the white filter 217 is reflected from the reflective part 227 and then is projected toward the top direction of the first substrate 210.

The LCD device 500 according to the embodiment can selectively display a color image or a black and white image by using the first and second drive modes.

Figure 6:
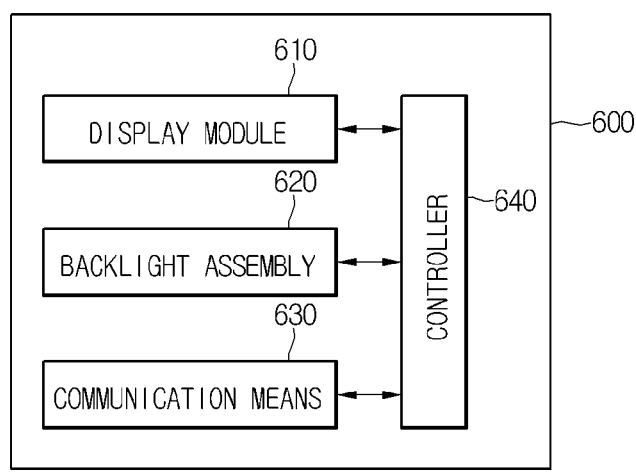
FIG. 6 is a view of a mobile communication terminal according to an embodiment.

Additionally, the display module according to the above-mentioned embodiment may be applied to a mobile communication terminal. As illustrated in FIG. 6, the mobile communication terminal 600 according to the embodiment may comprise a display module 610, a backlight assembly 620, a communication means 630, and a controller 640.

The backlight assembly 620 provides light to the display module 610. The communication means 630 communicates with the external entity. The controller 640 can control the display module 610, the backlight assembly 620, and the communication means 630.

As described above, the mobile communication terminal 600 can effectively perform a luminance sensor function and a touch panel function. Additionally, the mobile communication terminal 600 may comprise a first drive mode displaying a color image in a first direction of the display module 610 by using light provided from the backlight assembly 620 and a second drive mode displaying a black and white image in the first direction of the display module 610 by using light incident from the surrounding.

The mobile communication terminal 600 according to the embodiment can selectively display a color image or a black and white image if necessary by using the first and second drive modes.

Although embodiments have been described with reference to a number of illustrative embodiments thereof, it should be understood that numerous other modifications and embodiments can be devised by those skilled in the art that will fall within the spirit and scope of the principles of this disclosure.

INDUSTRIAL APPLICABILITY

The display module according to the embodiment and the LCD device comprising the same have advantages in effectively detecting surrounding luminance and a contact position of an object.

The invention claimed is:

1. A display module comprising:
   a first substrate comprising a red filter, a green filter, a blue filter, and a white filter;
   a second substrate disposed facing the first substrate and comprising:
      a first switching device and a first transparent electrode being formed corresponding to a position where the red filter is disposed, the center of the red filter and the center of the first transparent electrode being aligned along a first vertical axis,
      a second switching device and a second transparent electrode being formed corresponding to a position where the green filter is disposed, the center of the green filter and the center of the second transparent electrode being aligned along a second vertical axis,
      a third switching device and a third transparent electrode being formed corresponding to a position where the blue filter is disposed, the center of the blue filter and the center of the third transparent electrode being aligned along a third vertical axis, and
      a fourth switching device and a reflective part being formed corresponding to a position where the white filter is disposed, the center of the white filter and the center of the reflective part being aligned along a fourth vertical axis; and
   a liquid crystal layer formed between the first substrate and the second substrate,
   wherein light incident from an outside is directly provided at the fourth switching device,
   wherein the first switching device is formed on an intersection area of a gate line and a first sub-pixel data line, the second switching device is formed on an intersection area of the gate line and a second sub-pixel data line, the third switching device is formed on an intersection area of the gate line and a third sub-pixel data line, the fourth switching device is formed on an intersection area of the gate line and a fourth sub-pixel data line,
   wherein the reflective part is formed with a size corresponding to an area of the white filter, such that the reflective part prevents the light incident from the bottom of the white filter from transmitting through the white filter,
   wherein the first, second, and third transparent electrodes are formed in a same horizontal plane in the second substrate as the reflective part,
   wherein a size of the fourth sub-pixel area in which the fourth switching device and fourth sub-pixel data line are formed is smaller than a size of each of the first sub-pixel area in which the first switching device and first sub-pixel data line are formed, the second sub-pixel area in which the second switching device and second sub-pixel data line are formed, and the third sub-pixel area in which the third switching device and third sub-pixel data line are formed, and
   wherein a size of the white filter is smaller than a size of each of the red filter, the green filter, and the blue filter, and
   wherein the reflective part includes a first reflective part formed of a same material as a gate electrode constituting the fourth switching device, the first reflective part being formed on the same layer as the gate electrode constituting the fourth switching device, and the reflective part includes a second reflective part formed of a same material as a drain electrode constituting the fourth switching device, the second reflective part being formed on a same layer as the drain electrode constituting the fourth switching device.

2. The display module according to claim 1, comprising a light detection unit detecting an amount of a current flowing through the fourth switching device by incident light and measuring surrounding luminance.

3. The display module according to claim 1, comprising a contact position detection unit detecting changes in an amount of a current flowing through the fourth switching device and detecting a contact position of an object contacting a surface of the first substrate.

4. The display module according to claim 1, wherein one pixel displaying an image comprises at least each one of the red filter, the green filter, the blue filter, and the white filter as a sub pixel.

5. The display module according to claim 1, wherein the fourth switching device is a thin film transistor comprising an amorphous silicon layer.

6. The display module according to claim 5, wherein a current flowing through the fourth switching device is a photo leakage current occurring in the amorphous silicon layer by incident light.

7. The display module according to claim 5, wherein the reflective part comprises a first reflective part, the first reflective part being formed on the same layer as at least one of a gate electrode and a drain electrode constituting the thin film transistor.

8. A display module comprising: a pixel area comprising a gate line, a plurality of data lines intersecting the gate line, a first switching device formed on an intersection area of the gate line and a first sub-pixel data line, a first transparent electrode connected to the first switching device, a second switching device formed on an intersection area of the gate line and a second sub-pixel data line, a second transparent electrode connected to the second switching device, a third switching device formed on an intersection area of the gate line and a third sub-pixel data line, a third transparent electrode connected to the first switching device, a fourth switching device formed on an intersection area of the gate line and a fourth sub-pixel data line, and a reflective part connected to the fourth switching device, wherein the first, second, third, and fourth switching devices are formed corresponding to positions where red, green, blue, and white filters are disposed in a substrate, respectively; and
   a contact position detection area comprising the gate line, a sensing line intersecting the gate line, and a detection device disposed on an intersection area of the gate line and the sensing line, and being changed in an amount of a current flowing according to incident light,
   wherein light incident from an outside is directly provided at the detection device,
   wherein the reflective part is formed with a size corresponding to an area of the white filter, such that the reflective part prevents the light incident from the bottom of the white filter from transmitting through the white filter,
   wherein a size of the fourth sub-pixel area is smaller than a size of each of the first sub-pixel area, the second sub-pixel area, and the third sub-pixel area, and
   wherein a size of the white filter is smaller than a size of each of the red filter, the green filter, and the blue filter, and wherein the reflective part includes a first reflective part formed of a same material as a gate electrode constituting the fourth switching device, the first reflective part being formed on the same layer as the gate electrode constituting the fourth switching device, and the reflective part includes a second reflective part formed of a same material as a drain electrode constituting the fourth switching device, the second reflective part being formed on a same layer as the drain electrode constituting the fourth switching device.

9. The display module according to claim 8, wherein the detection device is a thin film transistor comprising an amorphous silicon layer.

10. The display module according to claim 9, wherein a current flowing through the detection device is a photo leakage current occurring by incident light.

11. The display module according to claim 8, wherein the reflective part comprises a first reflective part, the first reflective part being formed on the same layer as at least one of the gate line and the sensing line.

12. The display module according to claim 8, wherein an amount of a current flowing through the detection device is changed according to whether or not a voltage is applied to the gate line.

13. The display module according to claim 12, wherein changes in an amount of a current flowing through the detection device are detected through scan drive of the gate line, and whether there is an object contact or not and its contact position are determined.

14. The display module according to claim 13, wherein the contact position is detected and a menu item displayed on the contact position is executed.

15. The display module according to claim 1, wherein the reflective part includes a first reflective part formed of the same material on the same layer as a gate electrode constituting the fourth switching device, and a second reflective part formed of the same material on the same layer as a drain electrode constituting the fourth switching device.

* * * * *